United States Patent [19]
Auer

[11] Patent Number: 6,094,444
[45] Date of Patent: Jul. 25, 2000

[54] POINT-TO-POINTS SIGNAL TRANSMISSION SYSTEM

[75] Inventor: Erich Auer, Besigheim, Germany

[73] Assignee: Robert Bosch GmbH, Stuttgart, Germany

[21] Appl. No.: 09/017,739

[22] Filed: Feb. 3, 1998

[30] Foreign Application Priority Data

Feb. 13, 1997 [DE] Germany ............................ 197 05 449

[51] Int. Cl.[7] ...................................................... H04J 3/04
[52] U.S. Cl. .......................... 370/535; 370/345; 370/252
[58] Field of Search ................................... 370/345, 335, 370/336, 330, 343, 349, 329, 389, 236, 252, 535; 375/219, 209, 222, 216, 232

[56] References Cited

FOREIGN PATENT DOCUMENTS

| | | |
|---|---|---|
| 0 480 502 A2 | 4/1992 | European Pat. Off. . |
| 0 553 537 A1 | 8/1993 | European Pat. Off. . |
| 43 21 348 C1 | 5/1994 | Germany . |
| 44 26 183 A1 | 7/1994 | Germany . |

OTHER PUBLICATIONS

"Mikrowellensysteme Fuer Feste Und Mobile Funkdienste", by H. Rupp, Mikrowellen Magazine, vol. 10, No. 6, 1984.

*Primary Examiner*—Michael Horabik
*Assistant Examiner*—Prenell Jones
*Attorney, Agent, or Firm*—Michael J. Striker

[57] ABSTRACT

A point-to-multiple points signal transmission system includes a central station and several participant stations by which the transmission channels between the central station and the participants can be apportioned as required. The point-to-multiple point wireless transmission system includes a central station and a plurality of participants, the transmission channels being allocable between the central station and the participants as required. The system also includes a plurality of modems and a plurality of transmission channels for transmitting signals between the central station and the participants, the transmission channels being allocable as a function of the transmission requirements. The system further includes a control unit operable to adjust for each respective transmission channel of the send and receive channels, with respect to activated and packet-oriented traffic connections data, at least one of a group of transmission parameters including channel carrier frequency, data rate, modulation, coding, send gauge and indicia of signal quality rating as a function of at least one of the required count and bandwidth of the respective transmission channel and the required resistance of the respective transmission channel.

19 Claims, 7 Drawing Sheets

POINT-TO-POINTS SIGNAL TRANSMISSION SYSTEM

BACKGROUND OF THE INVENTION

The present invention relates to a point-to-multiple points signal transmission system of the type having a central station and several participant stations and by which the transmission channels between the central station and the participants can be apportioned as required.

Point-to-multiple point wireless transmission systems, whether earth-bound or satellite transmission systems, permit new signal connections to be relatively quickly installed or existing connections to be improved. In today's communication systems, one distinguishes between activated traffic connections with fixed or dynamic self changing data rates and packet-oriented traffic connections. The activated traffic connections include, for example, the telephone (analog or digital, POTS or ISDN), facsimile transmissions, data transmissions with a constant data rate over dedicated conduits or the like. Examples of packet-oriented traffic connections data traffic include the LAN-connections, the frame relay service, and, recently, the ATM transmissions; a characteristic of such examples is the burst-type transmission of data packets.

Wireless transmission systems in participant access domains for both types of communication systems should optimally exploit the available frequency spectrum. Ancillary requirements for the transmission are the capability to be as resistant as possible to interferences such as, for example, weather related fading, frequency selective fading, interferences from reflection, interferences from neighboring signal cells, interferences from other signal services, and amplitude-and phase shifting.

The demand for optimization of the available frequency spectrum can be satisfied by the use of a point-to-multiple points signal transmission system. A point-to-multiple points signal transmission system is exemplarily illustrated in Microwave magazine Vol. 10, No. 6, 1984, pages 629–630. Such an arrangement permits the exploitation of the frequency band of the available signal channels through a demand on the required frequency band which occurs only as needed. The {commq} between the central station and the individual participants proceeds through multiple processing in a frequency multiplex (FDMA), in time multiplexing (TMDA), in code multiplexing (CDMA), in space multiplexing (SDMA), or in a mixed form of these processing formats, whereby the frequency channels, the time slots, the {spread codes and the spaced antenna {clubs} can be allocated as desired in accordance with the requirements of the participant.

In German patent document DE 44 26 183 A1, a point-to-multiple points signal transmission system is disclosed in which the transmission capability is flexibly tailored or customized to the requirement of the participant so that the {bandwidth of the individual transmission channel to the individual participants can be arranged relative to the respective data transmission rate. Also, this point-to-multiple points signal transmission system permits an adjustment of the modulation type and the modulation grade (for example, N-PSK, with N=2 . . . 16 or M-QAM with M=4 . . . 256) for the individual transmission channels.

SUMMARY OF THE INVENTION

The present invention provides a point-to-multiple points signal transmission system of the type which, on the one hand, permits a flexible adaptation of the transmission capacity in a trouble and interference free manner to the activated participants and, on the other hand, optimizes the resistance against influences which can disturb the transmission.

According to one aspect of the point-to-multiple points signal transmission system of the present invention, the central station for each of the maximally available transmission channels includes a modem and even each participant includes a modem. Each such modem includes several sending channels and receiving channels. Activated data can be sent and received over some of these channels and packet-oriented traffic connections data can be transmitted over other of these channels. A control unit ensures that the packet-oriented traffic connections data is routed to different channels than those handling the activated data. The control unit adjusts for at least one of the transmission parameters of both the activated and packet-oriented traffic connections data (such as, for example, the channel frequency, the data rate, the modulation, the coding, the sending rules, the parameter to rate the signal quality) in accordance with the required count and bandwidth of the transmission channels and/or the required stored resistance of the transmission channels in the sending and receiving channels.

The separation of the activated data traffic from the packet-oriented traffic connections data traffic into at least two modem functions and thereby into two different physical transmission channels brings the following advantages. The demands on the transmission security (bit error rate) are, for example, clearly different for activated speaking connnections in a telephone net than the packet-oriented traffic connections data connections in, for example, an ATM (Asynchronous Transmission Mode) net. The physically independent transmission channels for the activated and packet-oriented traffic connections data connections allow for an individual optimization of the transmission pararmeter according to the corresponding requirements. This leads to an efficient utilization of the signal resources (frequency and sending performance) in comparison to other signal transmission systems.

Since the packet-oriented traffic connections data connection is in the form of a burst type transmission of data packets, the signal resources of the participant used during a transmission in TDM or TDMA processes can be optimally utilized in the time during the transmission of the data packets by other participants.

The transmission of activated data is in no way negatively impacted or disturbed by the transmission of packet-oriented traffic connections data due to the fact that the activated data is carried on physically different channels than the packet-oriented traffic connections data. Likewise, the transmission of packet-oriented traffic connections data is in no way negatively impacted or disturbed by the transmission of activated data due to the fact that the packet-oriented traffic connections data is carried on physically different channels than the activated data.

A decisive advantage is provided to the central control unit of the burst type packet-oriented traffic connections data by the utilization of the permanently available signaling channels which are transmitted along with the activated data. In other words, the laborious and exact time synchronization of all of the participants normally required in a known TDMA system can be foregone since a signaling channel is transmitted with the activated data and this channel can also be used for controlling the transmission times of the data packets.

In a pure TDMA system, there is the risk that an unsynchronized or falsely synchronized participant can destroy the entire signal cell. This risk is not present in the arrangement of the point-to-multiple points signal transmission system of the present invention since each participant is controlled via the permanently available signaling channel of the respective modem channel which transmits the activated data. The allocation of the transmission capacity for the packet-oriented traffic connections data is accomplished in accordance with the following arrangement. Initially, each of the participants forwards a demand to the base station. Thereafter, an examination of the entire range of the transmission parameters in undertaken by the control unit of the base station and eventually an allocation of the transmission channels and their transmission parameters is sent from the base station to the participants. In this way, a collision free operation between the activated and the packet-oriented traffic connections data is assured. Moreover, only those participants which are, as a result of continuous monitoring via the signaling channel, fully functional and in synch with the time control receive a send qualification. The transmission parameters—send frequency, send gauge, data rate, modulation type, channel coding and so forth—can be dynamic for the packet-oriented data, if required, and conformed from burst to burst to a given instantaneous condition of the wireless channel. Thus, the activated data and the packet-oriented data find an independent optimization of the transmission channels with a view to the best possible use of the wireless resources.

DETAILED DESCRIPTION OF THE PREFERRED EMBODIMENTS

Figure 1:
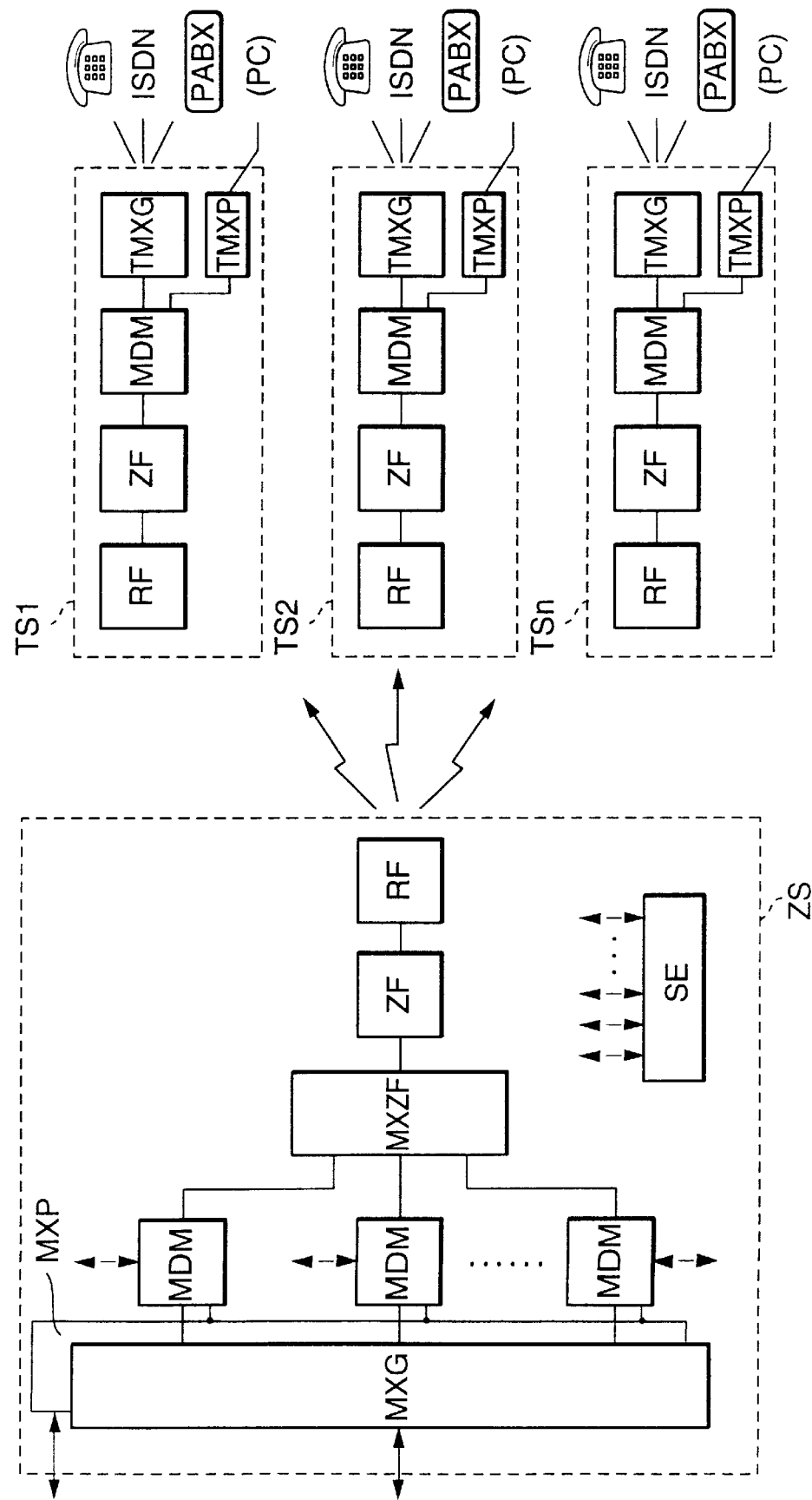
FIG. 1 is a schematic view of a point-to-multiple point wireless transmission system of the present invention which includes components for the transmission of activated and packet-oriented traffic connections data traffic.

As schematically shown in FIG. 1, one embodiment of the point-to-multiple point wireless transmission system of the present invention includes a central station ZS and several participants TS1, TS2 . . . Tsn. The central station ZS includes as many parallel activated modems MDM as the maximum number of participants TS1 of a signal connection for activated or packet-oriented traffic connections data can handle. All of the MDM of the central station ZS are coupled via both outputs to, respectively, a multiplexer/demultiplexer MXG or MXP and a multiplexer/demultiplexer MXZF. The MXG is representative of the connection to an activated information net and the multiplexer/demultiplexer MXP is representative of the connection to a packet-oriented information net.

A switch ZF is connected to the MXZF and is operable to convert the to be sent or received signals in an intermediate frequency plane. A send-receive unit (frontend) RF is connected to the switch ZF. The central station ZS includes a control unit SE which controls the signal resources as well as the allocation of the activated and packet-oriented traffic connections data traffic, as required, as is explained in more detail hereinbelow. The participants TS1 each have a configuration similar to that of the central station ZS. An interfrequency switch ZF is connected to a send/receive unit RF as well as to a modem MDM. A multiplexer/demultiplexer TMXG is provided as the connection for the activated traffic between the modem MDM and the end user apparatus (for example, a telephone) or, alternately, an open or private information net (ISDN or PABX). An additional TMXP is provided as the connection, with respect to the packet-oriented traffic connections data traffic, between the modem MDM and the accompanying end user apparatus (for example, PC or workstation with data-, LAN- or ATM-customized locations).

Figure 2:
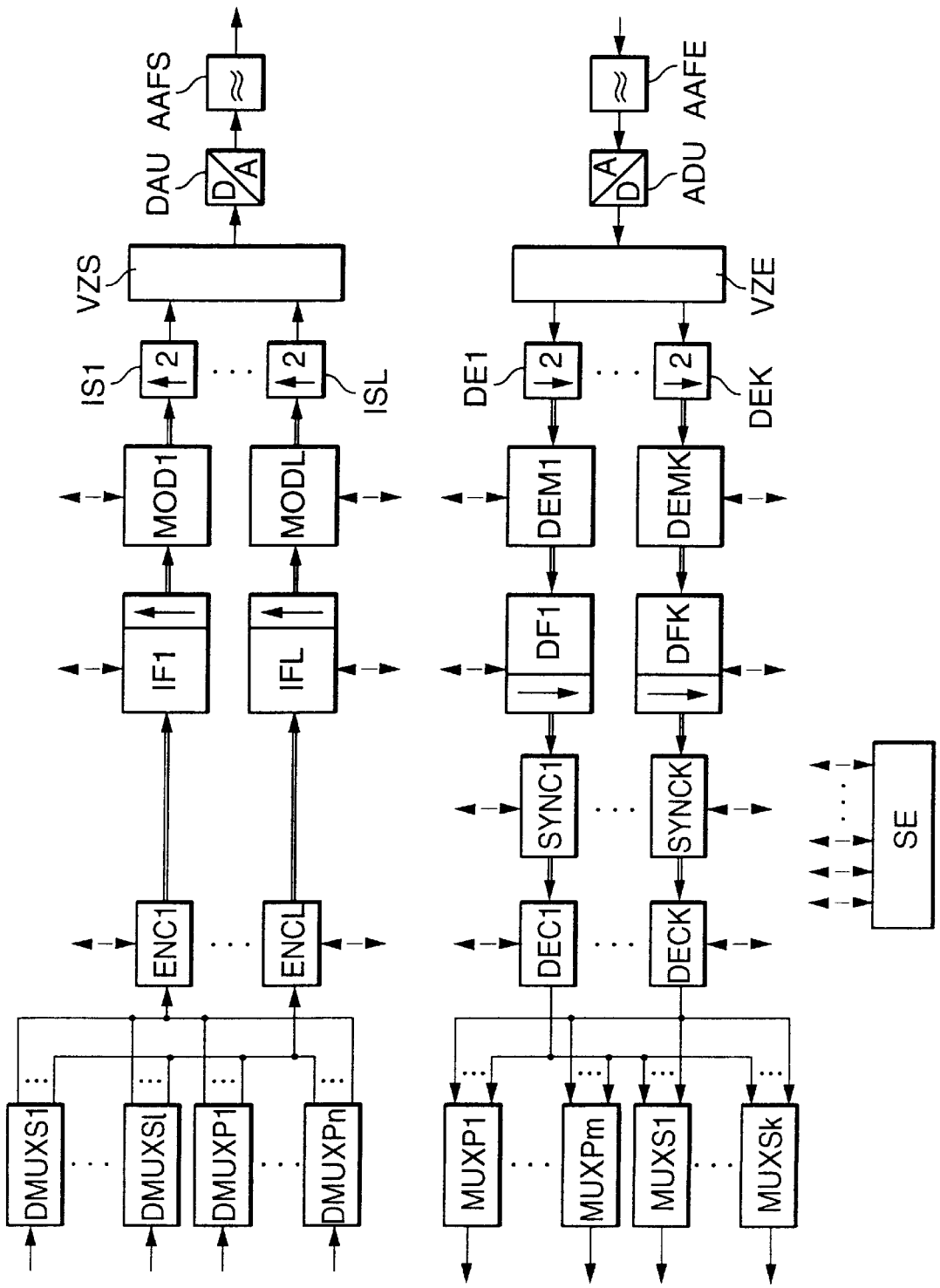
FIG. 2 is a schematic view of a type of modem which includes components for the transmission of activated and packet-oriented traffic connections data traffic.

As seen in FIG. 2, in an exemplary configuration of a modem, the modem parallels the configuration of the central station ZS and the individual participants TS1. The modem includes L-send channels and K-receiving channels, whereby L>2 or L=2 and K>2 or K=2 is stipulated. At least one of the L-send channels or the K-receiving channels is used, on one side, through switching for dynamically adapting the activated data traffic to the transmission parameter and, on the other side, used for burst type transmission of packet-oriented traffic connections data traffic between the switching processes. For these reasons, it is provided, in the send apparatus 1 (1 less than or equal to l less than or equal to L−1; L greater than or equal to 2) demultiplexer DMUXS1–DMUXSl, which conduct the packet-oriented traffic connections data traffic, in an automatic selection manner, to one of the n–L encoders ENC1–ENCl which is not occupied with packet-oriented traffic connections data traffic. As ancillary conditions for l and n, it is understood that the following conditions must still apply: l+n less than L; L greater than 2.

Each of the encoders ENC1–ENCL is associated with one of the L-send channels. As indicated by the double line delineations in the drawings of the connection conductors, the digital data signals here are complex; in other words, they have a real- and an imaginary-component. In each L encoder ENC1–ENCL is installed a variable interpolation filter IF1–IFL (channel filter). In each signal pad, a respective modulator MOD1–MODL is connected the respective channel filter and each modulator is set to the frequency of its associated send channel. Interpolators IS1–ISL with fixed interpolation factor 2 (in accordance with, for example, the disclosure of German patent document DE 36 21 737 C2) are connected to the outputs of the modulators IS1–ISL and these interpolators convert the complex digital output data signals of the modulators MOD1–MODL into real digital data signals. The real digital data signal of each respective send channel is transmitted over a branch VZS to a common digital/analog converter DAU which converts the digital signal into an analog signal. The analog signal is ultimately transmitted to an anti alias filter AAFS.

As viewed in the opposite direction (in the receiving direction), an analog data signal is received from an anti alias filter AAFS by an analog/digital converter ADU. The real data signal outputted therefrom is transmitted over a branch VZE to all of the receiving signal pads, each of which has a K receiving channel associated with it. Each receiving signal pad 1–K has a decimator filter DF1–DFK (matched filter) is connected, in each signal pad, to one of the demodulators DEM1–DEMK.

The decimator filters DF1–DFK as well as the interpolation filters IF1–IFL fulfill the Wurzel-Nyquist conditions. The configurations and operations of such variable decimator and interpolation filters are described in the "Proceedings Second European Conference on Satellite Communications", Liege, Belgium, October 1991, ESA P-332, pages 457–464.

Synchronization switches SYNC1–SYNCK are provided in the K receiving signal pads and such switches are known from, for example, the "Proceedings Second European Conference on Satellite Communications". These switches synchronize the switching of each signal pad to the transmit frequency, the transmit phase, and the receipt rhythm of the received data signals. Thus, each modem is independent from the synchronization signals, which otherwise would have to transmitted over together with the receiving signals.

A respective decoder DEC1–DECK is connected to the end of each receiving signal pad 1–K. The coding in the send signal pads 1–L as well as the decoding in the receiving signal pads 1–K is preferably accomplished via Viterbi coders/decoders and selectively with additionally associated Reed-Solomon coders/decoders.

In accordance with the selected usage of the channels for the activated and packet-oriented traffic connections data traffic, as described hereinabove with respect to the sending side, there is also provided a corresponding selective allocation of the receiving channels. In this regard, as viewed in the receiving direction, there are k (1 less than k less than K−1; K greater than 2) multiplexer MUXS1–MUXSk, which transmit, in an automatic selection manner, the activated data traffic from each of the K decoders DEC1–DECK to the associated k output. Moreover, as viewed in the receiving direction, there are still m (1 less than m less than K−1; K greater than 2) multiplexer MUXP1–MUXPm, which transmit, in an automatic selection manner, the packet-oriented traffic connections data traffic from the respective m K decoders DEC1–DECK which are not occupied with activated data traffic to the associated m outputs. As ancillary conditions for k and m, it is understood that the following conditions apply: k+m less than K; K greater than 2.

Figure 3:
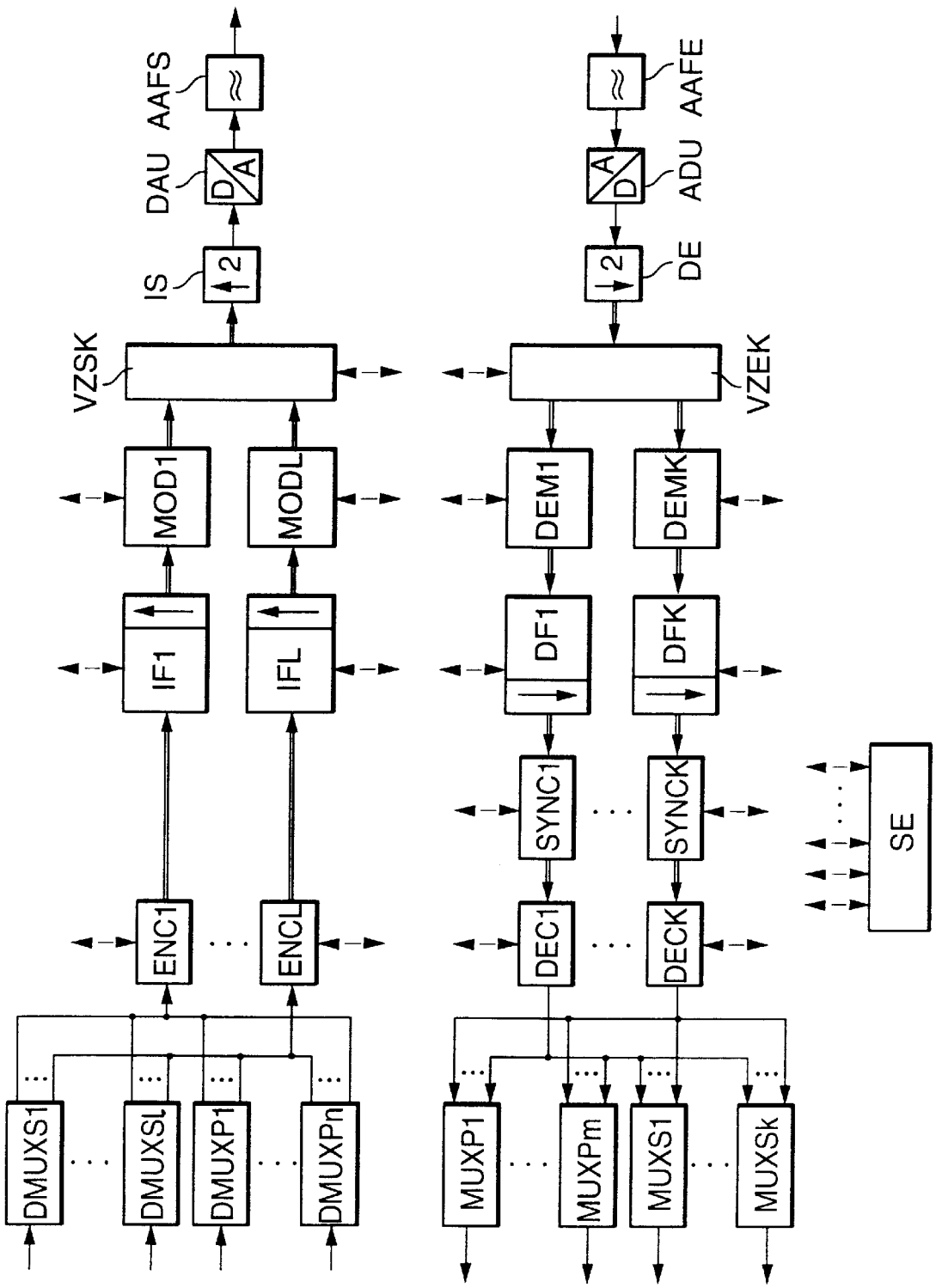
FIG. 3 is a schematic view of another type of modem which includes components for the transmission of activated and packet-oriented traffic connections data traffic.

Instead of dedicating a respective interpolator IS1–ISL to each individual send signal pad 1–L or a respective decimator DE1–DEK to each individual receive signal pad 1–K, as is shown in FIG. 2, the configuration shown in FIG. 3 can be used in which a single interpolator IS and a single decimator DE can be associated with the L send signal pads and the K receive signal pads, respectively. The branch VZEK disposed in front of the interpolator IS and the branch VZEK disposed behind the decimator DE must be capable of distributing complex digital signals or, respectively, collecting such signals. The switch shown in FIG. 3 is similar to that shown in FIG. 2 in all other respects.

The branches VZS and VZE for real digital signals as shown in FIG. 2 as well as the branches VZSK and VZEK for complex digital signals as shown in FIG. 3 can be configured as frequency multiplexers (VZS and VZSK in the sending direction) or, respectively, frequency demultiplexers (VZE and VZEK in the receiving direction).

The interpolators IS, IS1–ISL, and the decimators DE and DE1–DEK can be configured as complex half band filters (see, for example, European patent document EP 0 250 926 B1).

The complex transfer forcing functions for the complex digital modulators MOD1–MODL and the demodulators DEM1–DEMK are executed in an as needed manner by the method of the direct digital synthesis (DDS, compare "Analysis of the Output Spectrum Of Direct Digital Frequency Synthesizers in the Presence of Phase-Accumulator Truncation", IEEE 1987, 41sT. Annual Frequency Synthesizers, pages 495 and following).

The point-to-multiple point wireless transmission system should, as so described, render possible a very flexible allocation of transmission channels between the central station and the participants not only for the activated data traffic but also for the packet-oriented traffic connections data traffic. Thus, the available signal channel for each respective traffic approach are optimally exploited. The count of the channel carrier frequency, the activated data carried over additional carriers, and the packet-oriented traffic connections data can all be exchanged by implementation of the point-to-multiple point wireless transmission system of the present invention. The available control unit SE in the central station ZS controls the construction and deconstruction of, as well as the changes to, the transmission parameters for both the activated data and the packet-oriented traffic connections data. The changeable transmission parameters include, initially, for each individual channel, the data rate, the modulation type or modulation grade (for example, N-PSK with N=2 . . . 16 or M-QAM with M=4 . . . 256, the coding, the channel frequency, or the send gauge and parameter for signal quality rating, in order to minimize a predetermined data transmission quality (for example, bit error rate<{10 to the minus 7}) and signal field influences (fading and reflection).

In addition, the variable transmission parameters include the count of the channel carrier frequencies which are effectuated by the transmission and which include the single carrier and multiple carrier transmission. In a multiple carrier transmission, each individual channel carrier frequency is individually controlled within the entirety of the transmission parameters described hereinabove. In this regard, it is moreover significant that the channel carrier frequencies for the activated data traffic are optimized with respect to their transmission parameters by the control unit SE completely independent from the channel carrier frequencies for the packet-oriented traffic connections data traffic. In the event of a change in the transmission parameters, the control unit SE provides the corresponding control signal (shown by the double headed arrows in the drawings) to the affected switch blocks in the modems.

The control signals for the modems in the participants are, for example, carried over a signaling channel which is either coupled with one or more utility signal channels of the activated data traffic or broadcast as its own broadcast channel. The data rate of the all of the send channels 1–L is set in the variable interpolation filters IF1–IFL and the data rate of all of the receive channels 1–K is set in the decimator filters DF1–DFK. Changes in the transmission frequency of the send channel 1–L are processed in the modulators MOD1–MODL and changes in the transmission frequency of the receive channels 1–K are processed in the demodulators DEM1–DEMK. A change in the modulation and the coding is processed for the transmission frequency of the send channel 1–L in the encoder ENC–ENCL and for the transmission frequency of the receive channel 1–K in the decoders DEC1–DECK.

As described hereinabove, each modem unit includes L—send channels and K—receive channels. The count 1 of the active send channels for the activated data traffic may maximally reach the count L−1 so that at least one send channel is available for accommodating changes in the transmission parameters as well as changes in the transmission of packet-oriented traffic connections data traffic. Similarly, the count k of the active receive channels switched over for the transmission of activated data traffic can reach a maximum count of K–1 so that at least one receive channel is available for accommodating changes in the transmission of packet-oriented traffic connections data traffic. The count 1–K of the channels with activated data traffic and the count n or, respectively, m, of the channels with packet-oriented traffic connections data traffic can be dynamically changed within the limits described hereinabove.

In the event that the control unit SE either receives a request for a change in the transmission channel or the control unit has determined the necessity of a change as a result of an increase in the resistance and has correspondingly newly calculated the transmission parameter. the control unit provides the new transmission parameter as a control signal to the affected switch blocks of an unoccupied send or receive channel. As soon as the new transmission parameter has been incorporated into the affected send and/or receive channels of the modem of the central station as well as into the participants, the control unit SE awaits a confirmation of the successful acquisition by all of the newly active send and/or receive channels of the signal pad before the signal transfer to the newly active send and/or receive channels is undertaken. The previously active send and/or receive channels can then be deactivated or, alternately, made available for handling packet-oriented traffic connections data traffic. In this manner, negatively impacting interruptions of the signal transfer can be avoided.

The selection of the send and/or receive channels for the activated and packet-oriented traffic connections data traffic in the affected modems of the central station and the participants is undertaken by the control unit SE taking into account the status information, which of the channels are being used for activated and packet-oriented traffic connections data traffic, and which of these are active or inactive.

In the above-described example of the point-to-multiple point wireless transmission system of the present invention, each respective send or receive channel is associated with a single signal pad. This means that, for the send and receive components, a substantial portion of the switch block must be available on the order of L times or, respectively, K times. This commitment of switching can be reduced since a portion of the L send signal pads as well as a portion of the K receive signal pads are operated in the time multiplexer.

Figure 4:
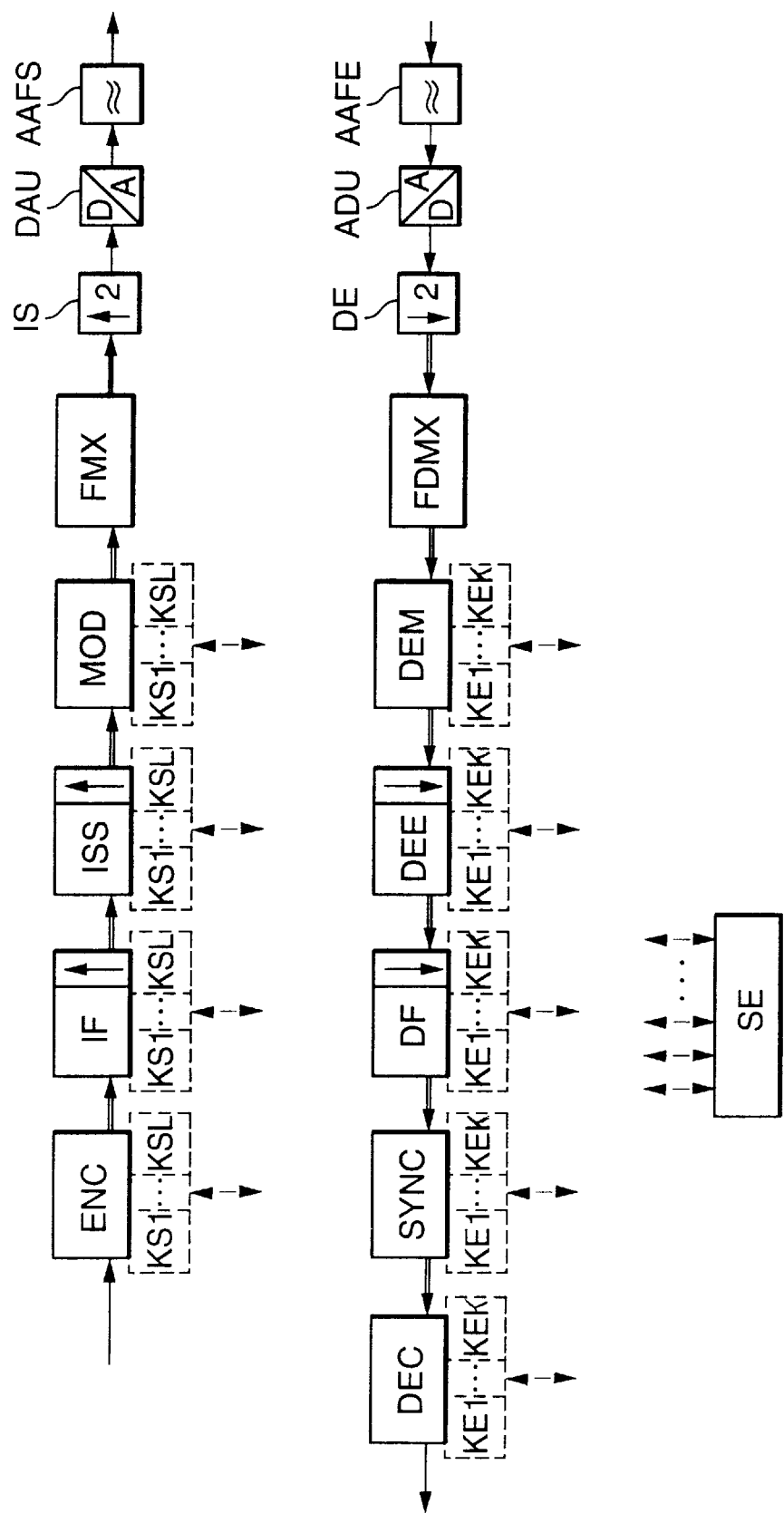
FIG. 4 is a schematic view of a modem with various multiplexed sending and receiving channels.

In FIG. 4, a signal pad for the L send channel and a signal pad for the K receive channel are shown. The send signal pad includes an encoder ENC for the L send channel, a variable interpolation filter IF, and a modulator MOD. Additionally, an additional interpolator ISS with a fixed interpolation factor can be disposed between the variable interpolation filter IF and the modulator MOD. Due to the additional interpolator ISS, the variable interpolator IF only needs a relatively small interpolation factor. Further details concerning the function of the individual switch blocks ENC, IF, ISS, MOD and the switch blocks coupled to the frequency multiplexer FMX (interpolator IS, digital/analog converter DAU, and anti alias filter AAFS) are not herein provided, since these have already been described in the examples of the point-to-multiple point wireless transmission system shown in FIGS. 2 and 3. Likewise, further details of the individual switch blocks of the receive signal pads shown in FIG. 4 are not herein provided. Nonetheless, the switch block shown in FIG. 4 is a receive signal pad of which the switch blocks for transferring the K receive channels are only schematically shown. The optional decimator DEE with a fixed decimator factor disposed between the demodulator DEM and the variable decimator filter DF enables a configuration in which the variable decimator filter DF is provided with a relatively smaller decimator factor.

In FIG. 4, individual switch units are shown in dash line boxes and these represent the concept that the L send channels KS1–KSL are operated by a send signal pad processor in a time multiplexed manner and the K receive channels KE1–KEK are operated by a receive signal pad processor in a time multiplexed manner.

The L send channels are collected by a frequency multiplier FMX from the modulator MOD in a send signal and the handling of a receive signal in the K receive channels is accomplished through a frequency demultiplexer FDMX directed by one of the demodulators DEM.

Figure 5:
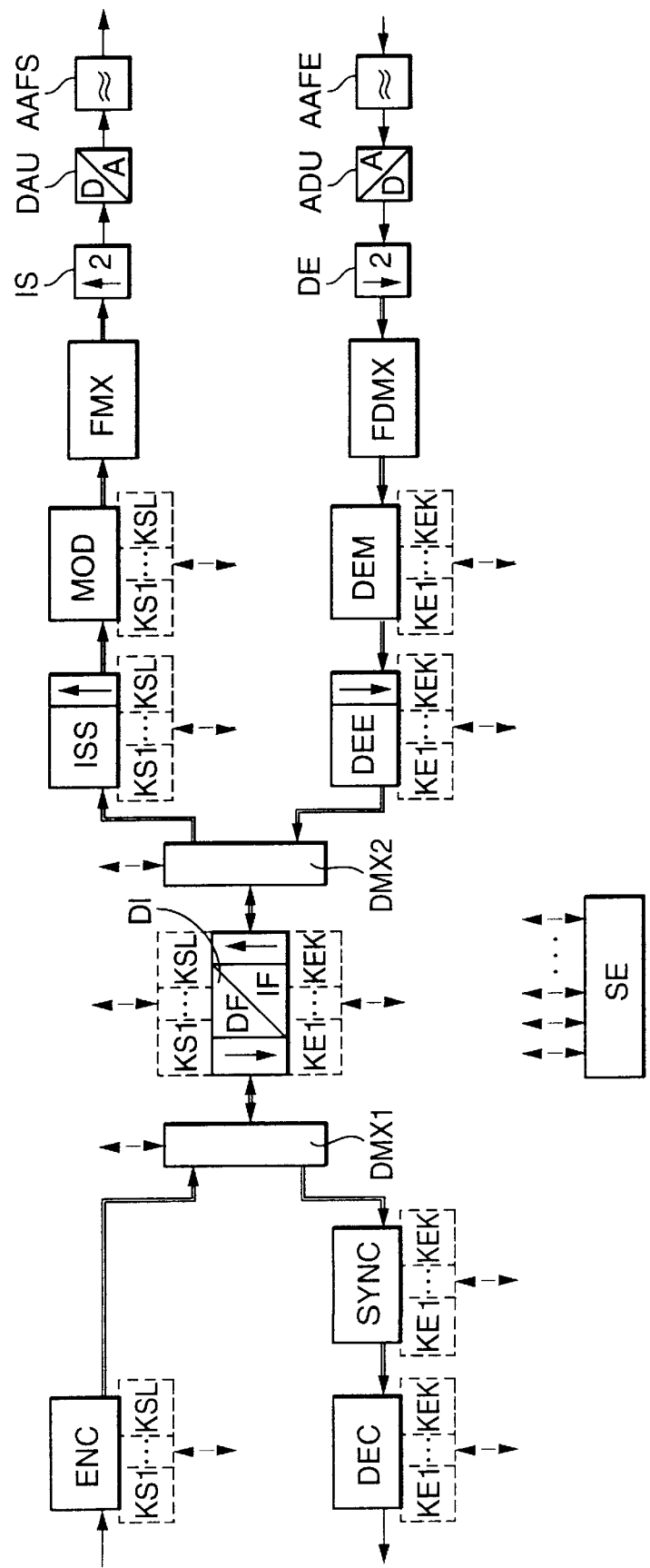
FIG. 5 is a schematic view of a modem with various multiplexed sending and receiving channels.

A further concentration of the switch units can be implemented, as seen in FIG. 5, in accordance with multiplex handling by a single unit of the variable decimation and the variable interpolation of the L send channels and the K receive channels. In this configuration, a function unit DI is provided which comprises a variable decimator filter DF as well as a variable interpolation filter IF.

The multiplexer/demultiplexer DMX1 and DMX2 on the two ports of the function unit D1 are provided so that the L send channels and the K receive channel can be time multiplexed in the function unit D1. All of the other switch units, which are designated with the same numerals in FIG. 4, also have the same function as the configuration shown in FIG. 4.

Figure 6:
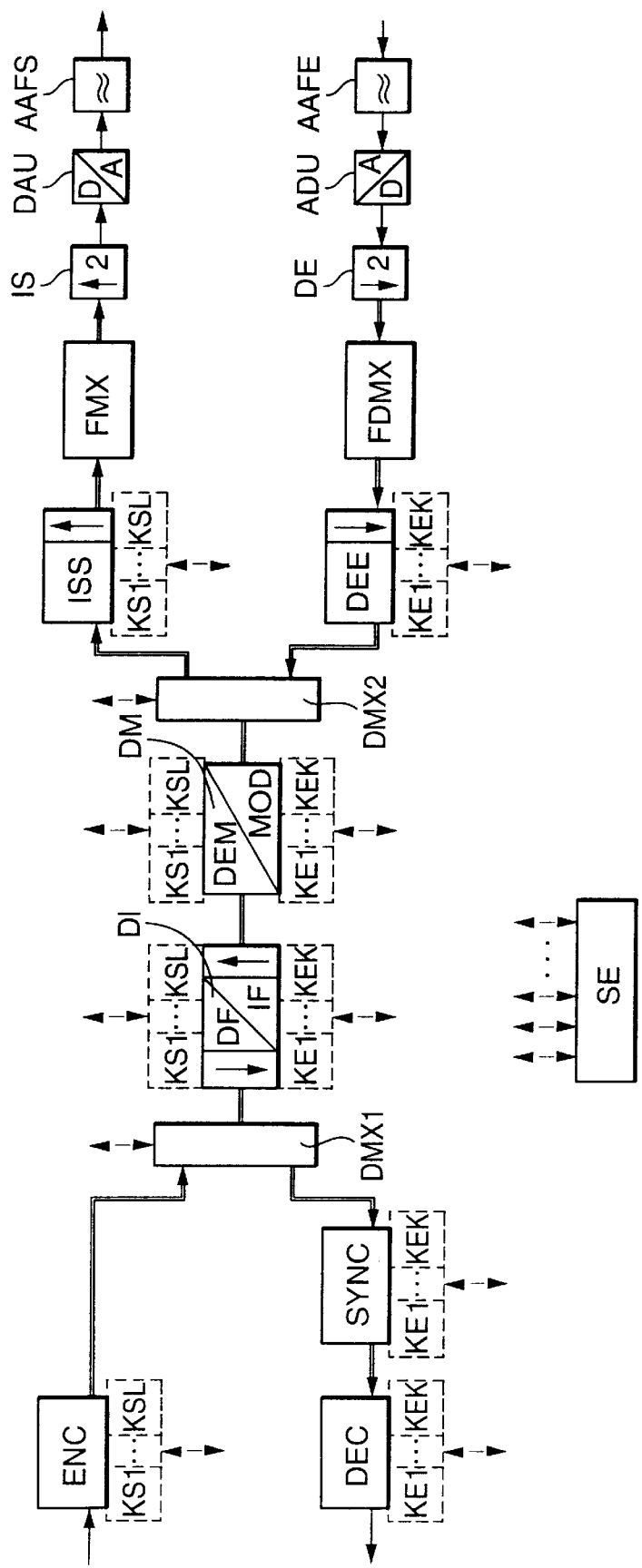
FIG. 6 is a schematic view of a modem with various multiplexed sending and receiving channels.

As seen in the modem shown in FIG. 6, the demodulator DEM and the modulator MOD are placed together in a common function unit DM which is operable to process the L send channels and the K receive channels in a time multiplexed manner. This switch variation of the modem effectuates an even further reduction of the switching effort. Nonetheless, the interpolator ISS and the decimator DEE comprise complex coefficients.

Figure 7:
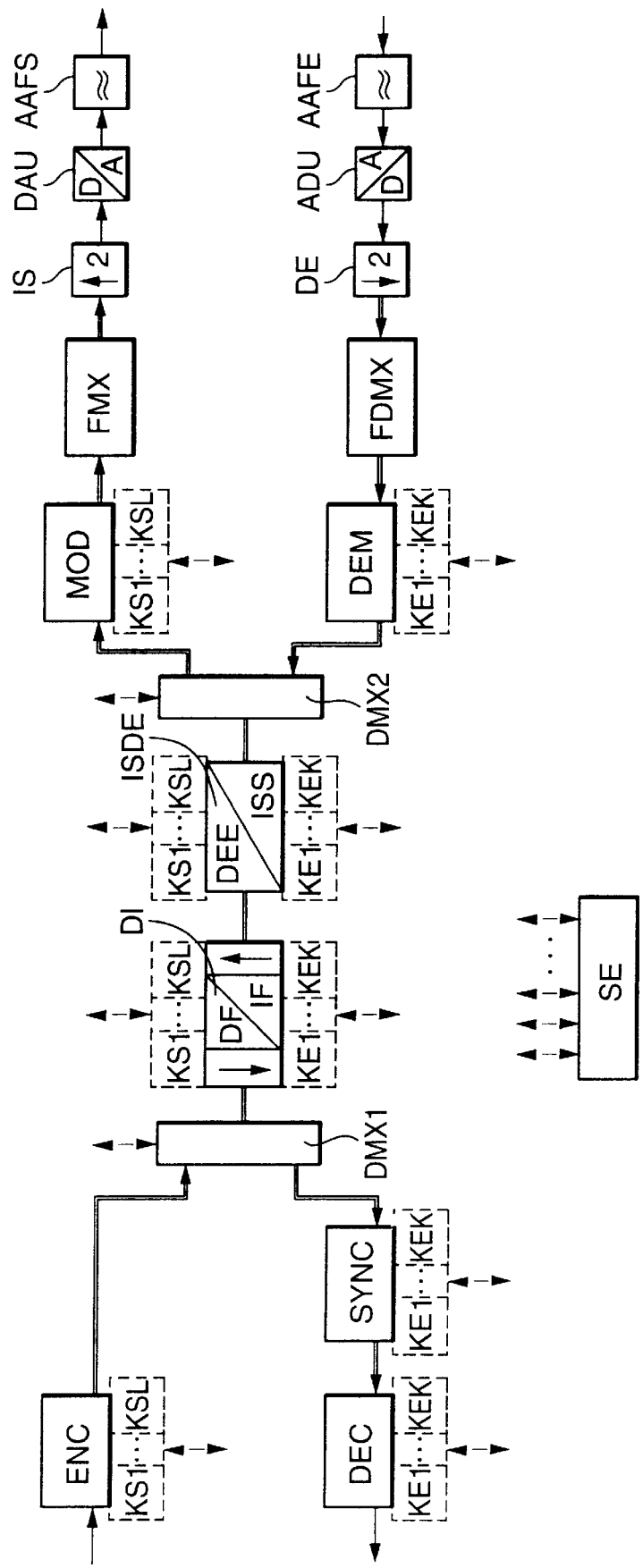
FIG. 7 is a schematic view of a modem with various multiplexed sending and receiving channels.

In FIG. 7, another configuration of the switch is shown which reduces the switching effort required even more than the configuration shown in FIG. 6. The series of modulators MOD and the decimators DEE are exchanged and the the series of demodulators DEM and decimators DEE are exchanged whereby the interpolator ISS and the decimator DEE can be operated with real coefficients; both of these are incorporated in a common function unit ISDE. The advantage of the time multiplex processing of the send and receive signals is preserved.

In lieu of the switch over to the not yet active send and receiving channels, a continuous variation of the transmission parameter can be accomplished in each individual send or receive channel. The transfer can be interrupted for a relatively short time so that, during the interruption interval, the transmission parameter can be changed. During the interruption interval, the received or to be sent data is temporarily stored so that it is not lost.

I claim:

1. A point-to-multiple point wireless transmission system comprising:

a central station;

a plurality of participants, the transmission channels being allocable between the central station and the participants as required;

a plurality of modems (MDM) such that each transmission channel available in the central station has a modem associated with it and each of participants (TS1 ... ) has a modem associated with it, each modem (MDM) including L send channels, whereby L is less than 2, and K receive channels, whereby K is less than or equal 2;

a plurality of transmission channels for transmitting signals between the central station and the participants, the transmission channels being allocable as a function of the transmission requirements and including a quantity l of L send channels with 1 less than or equal to l<L−1, a quantity k of K receive channels with 1 less than or equal to k less than or equal to K−1 for the transmission of activated data, a quantity n of the L send channels with 1 less than n less than L−1, and a quantity m of the K receive channels with 1 less than m less than K−1 for the transmission of packet-oriented traffic connections data; and a control unit (SE) operable to adjust for each respective transmission channel of the send and receive channels, with respect to activated and packet-oriented traffic connections data, at least one of a group of transmission parameters including channel carrier frequency, data rate, modulation, coding, send gauge and indicia of signal quality rating as a function of at least one of the required count and bandwidth of the respective transmission channel and the required resistance of the respective transmission channel.

2. The point-to-multiple point wireless transmission system according to claim 1 wherein the control unit (SE) is operable to transmit a control signal to the modems to change a transmission parameter and the control signal is transmitted to the modems via a signaling channel within the send and receive channels for activated data and packet-oriented traffic connections data.

3. The point-to-multiple point wireless transmission system according to claim 1 wherein the control unit is operable to control a change in a transmission parameter in at least one of the send and receive channels for the transmission of packet-oriented traffic connections data in a time interval between the individually transmitted data packets and to control the implementation of a change in a transmission parameter for activated data in at least one of the send and receive channels such that the at least one channel is a channel in which no activated data is currently being transmitted and the transmission of the parameter change is only effected after a completed acquisition of the at least one channel.

4. The point-to-multiple point wireless transmission system according to claim 1 and further comprising a common frequency channel for the transmission of packet-oriented traffic connections data to the participants in a time multiplexed manner.

5. The point-to-multiple point wireless transmission system according to claim 1 and further comprising an encoder (ENC1–ENCL) and a modulator (MOD1–MODL) associated with each of the L send channels and a variable interpolation filter (IF1–IFL) disposed between each respective encoder and modulator associated with an L send channel.

6. The point-to-multiple point wireless transmission system according to claim 5 and further comprising a plurality of interpolators (IS1–ISL), each interpolator being associated with a respective one of the modems (MOD1–MODL) and being operable to convert a complex digital output signal of the modulator into a real digital signal.

7. The point-to-multiple point wireless transmission system according to claim 5 and further comprising an interpolator (IS) and a branch connection (VZSK) interconnecting the L send channels and the interpolator (IS) such that an output signal is conducted from one of the L modulators (MOD1–MODL) of the L send channels to the interpolator (IS) for conversion thereby of the complex digital output signal into a real digital signal.

8. The point-to-multiple point wireless transmission system according to claim 1 and further comprising a plurality of encoders (ENC) and a plurality of modulators (MOD), each associated with one of the L send channels and a plurality of variable interpolation filters (IF) each disposed between a respective encoder (ENC) and a modulator (MOD) and the encoders, the modulators, and the interpolation filters of the L send channels are operated in a time multiplexed manner.

9. The point-to-multiple point wireless transmission system according to claim 8 and further comprising a plurality of multiplexers (FMX) for communicating a complex digital output signal of a modulator (MOD) to an interpolator (IS) for conversion thereby of the output signal into a real digital signal.

10. The point-to-multiple point wireless transmission system according to claim 1 and further comprising a plurality of demodulators (DEM1–DEMK) and a plurality of decoders (DEC1–DECK), each demodulator and decoder being associated with a respective one of the K receive channels and a plurality of variable decimation filters (DF1–DFK) each for communicating one of the demodulators and one of the decoders.

11. The point-to-multiple point wireless transmission system according to claim 10 and further comprising a plurality of decimators (DE1–DEK) each associated with a respective one of the demodulators (DEM1–DEMK) and being operable to convert a real digital receive signal into a complex digital signal.

12. The point-to-multiple point wireless transmission system according to claim 10 and further comprising a decimator (DE) associated with the K receive channels and operable to convert a real digital receive signal into a complex digital signal and a branch connection VZEK for communicating the converted signal to the demodulators (DEM1–DEMK) of the K receive channels.

13. The point-to-multiple point wireless transmission system according to claim 1 and further comprising a demodulator (DEM), a decoder (DEC), and a variable decimation filter (DF) interconnecting the demodulator and the decoder, all associated with the K receive channels and operating with all of the K receive channels in a time multiplexed manner.

14. The point-to-multiple point wireless transmission system according to claim 13 and further comprising a decimator (DE) and a demultiplexer (FDMX), the decimator being operable to convert a real digital receive signal into a complex digital receive signal and the demultiplexer being operable to communicate a complex digital receive signal to the demodulator (DEM).

15. The point-to-multiple point wireless transmission system according to claim 6 wherein the interpolator (IS1–ISL) is a complex half band filter.

16. The point-to-multiple point wireless transmission system according to claim 7 wherein the sending side branch connection (VZSK) is a frequency multiplier.

17. The point-to-multiple point wireless transmission system according to claim 8 wherein the multiplexer/demultiplexer (DMX1, DMX2) and the L send channels and the K receive channels are operable to process signals in a time multiplexed manner with a common function unit (DE) having a variable decimation filter and a variable interpolation filter.

18. The point-to-multiple point wireless transmission system according to claim 8 wherein the multiplexer/demultiplexer (DMX1, DMX2) and the L send channels and the K receive channels are operable to process signals in a time multiplexed manner with a first function unit (DI) having a variable decimation filter and a variable interpolation filter and with a second function unit (DM) with a modulator and a demodulator.

19. The point-to-multiple point wireless transmission system according to claim 8 wherein the multiplexer/demultiplexer (DMX1, DMX2) and the L send channels and the K receive channels are operable to process signals in a time multiplexed manner with a first function unit (DI) having a variable decimation filter and a variable interpolation filter and with a second function unit (ISDE) with an interpolator having a set interpolation factor and a decimator having a set decimation factor.

* * * * *